(12) United States Patent
Baldwin

(10) Patent No.: US 7,058,144 B2
(45) Date of Patent: Jun. 6, 2006

(54) INTELLIGENT CONTROL SYSTEM AND METHOD FOR COMPENSATION APPLICATION IN A WIRELESS COMMUNICATIONS SYSTEM

(75) Inventor: Keith R. Baldwin, Melbourne Beach, FL (US)

(73) Assignee: Conexant, Inc., Red Bank, NJ (US)

( * ) Notice: Subject to any disclaimer, the term of this patent is extended or adjusted under 35 U.S.C. 154(b) by 845 days.

(21) Appl. No.: 10/121,762

(22) Filed: Apr. 12, 2002

(65) Prior Publication Data

US 2003/0058962 A1 Mar. 27, 2003

Related U.S. Application Data

(60) Provisional application No. 60/310,571, filed on Aug. 7, 2001.

(51) Int. Cl.
*H04B 1/10* (2006.01)
*H03H 7/30* (2006.01)

(52) U.S. Cl. .......................... 375/346; 375/229

(58) Field of Classification Search ................ 375/150, 375/152, 316, 340, 341, 342, 343, 229, 278, 375/284, 285, 346
See application file for complete search history.

(56) References Cited

U.S. PATENT DOCUMENTS 5,613,218 A 3/1997 Li et al.

| 6,408,022 B1* | 6/2002 | Fertner .......................... 375/230 |
| 6,408,023 B1* | 6/2002 | Abdesselem et al. ........ 375/232 |
| 6,717,995 B1* | 4/2004 | Zvonar .......................... 375/340 |
| 6,775,521 B1* | 8/2004 | Chen ......................... 455/67.11 |

FOREIGN PATENT DOCUMENTS

EP 0 966 113 A1 12/1999
WO WO 01/20789 A1 3/2001

OTHER PUBLICATIONS

PCT Notification of Transmittal of the International Search Report or the Declaration, dated Oct. 25, 2002, 6 pages.

* cited by examiner

*Primary Examiner*—Young T. Tse
*Assistant Examiner*—Sam K. Ahn
(74) *Attorney, Agent, or Firm*—Hunton & Williams LLP

(57) ABSTRACT

A wireless receiver including a baseband processor that includes a compensation system that selectively includes an equalizer and a CMF that process received digital samples from a wireless medium, and a CIR estimator that calculates filter weights based on the samples. A memory stores default filter weights and select logic selects between calculated filter weights of the CIR estimator and the default filter weights from the memory. An SNR estimator receives the samples and provides an SNR metric and a multipath estimator receives the calculated filter weights and provides a multipath metric. The decision logic determines an operating point of the receiver using the SNR and multipath metrics, makes a decision based on the determined operating point according to a predetermined packet error rate (PER) performance mapping, and controls the select logic to select between the default and calculated filter weights and selectively enables the equalizer.

32 Claims, 8 Drawing Sheets

INTELLIGENT CONTROL SYSTEM AND METHOD FOR COMPENSATION APPLICATION IN A WIRELESS COMMUNICATIONS SYSTEM

CROSS-REFERENCE TO RELATED APPLICATION(S)

The present application is based on U.S. Provisional Patent Application entitled "Intelligent Control System And Method For Compensation Application In A Wireless Communications System", Ser. No. 60/310,571, filed Aug. 7, 2001, which is hereby incorporated by reference in its entirety.

FIELD OF THE INVENTION

The present invention relates to wireless communications, and more particularly to an intelligent control system for deciding when to employ channel compensation in a wireless communications system.

DESCRIPTION OF RELATED ART

The communications capacity for an indoor wireless communications device is limited by the amount of ambient noise seen at the receiver and the amount of multipath spreading of the transmitted signal. Multipath spreading is caused by multiple reflections of the transmitted signal, such as from walls, tables, etc. Ambient noise may be below the receiver's own thermal noise. It is often minimized by good receiver and signal design. However, in the absence of multipath distortion, noise (ambient or receiver thermal) sets the limit for receiver performance. Alternatively, multipath distortion, if present, can be sufficiently debilitating to set a performance limit significantly more severe that the limit imposed by the noise alone. For any given location of transmitter and receiver, either noise or multipath distortion or a combination of both can set the communication link performance limit.

Multipath effects can be mitigated using signal processing techniques such as a Channel Matched Filter (CMF) and/or an Equalizer. CMFs and Equalizers estimate the multipath profile and attempt to undo the distortion by applying inverse filtering. The estimation processes employed in these algorithms tend to fail, however, when increasing amounts of noise are present. It is desired to find a practical way to improve performance depending on the noise and multipath environment seen at the receiver.

SUMMARY OF THE INVENTION

A wireless receiver according to an embodiment of the present invention includes a radio that converts radio frequency (RF) signals received from a wireless medium to baseband signals and a baseband processor. The baseband processor includes an analog to digital converter (ADC), a compensation system, a channel impulse response (CIR) estimator, a signal to noise ratio (SNR) estimator, a multipath estimator, and decision logic. The ADC samples the baseband signals at a predetermined sample rate and provides corresponding digital samples. The compensation system selectively provides compensation to the samples. The CIR estimator calculates filter weights based on the digital samples. The SNR estimator receives the samples and provides an SNR metric. The multipath estimator receives the calculated filter weights and provides a multipath metric. The decision logic determines an operating point of the receiver based on the SNR and multipath metrics. The decision logic makes a decision based on the determined operating point according to a predetermined packet error rate (PER) performance mapping and controls the compensation system.

The SNR estimator may include a first power estimator that integrates a first plurality of the samples while no packets are being transmitted in the wireless medium to measure a noise power level, and a second power estimator that integrates a second plurality of the samples while a packet is being transmitted in the wireless medium to measure a packet power level. The SNR estimator further includes a combiner that provides the SNR metric based on the measured noise and packet power levels. In one embodiment, the first plurality of samples includes 32 bins of 32 noise samples each to develop a moving average and the second plurality of samples includes 8 bins of 32 packet samples each.

The multipath estimator may include a magnitude block, a storage device, a peak determination block, a peak extraction block, a sidelobe extraction block, a weight and summation block and a divider. The magnitude block retrieves the magnitudes of selected CIR estimator samples. The storage device stores the retrieved magnitudes. The peak determination block identifies a peak magnitude of the selected CIR estimator samples. The peak extraction block extracts the peak magnitude and the sidelobe extraction block extracts sidelobes of the selected CIR estimator samples from the storage device. The weight and summation block weights the sidelobe magnitudes according to a selected weighting scheme and sums the weighted sidelobes together to provide a sidelobe sum value. The divider divides the peak magnitude by the sidelobe sum value to determine the multipath metric. In one configuration, the magnitude block selects 10 contiguous samples of a 22 sample CIR estimator having a highest energy level and the weighting scheme applies a linearly increasing weighting to the sidelobe magnitudes. The selected CIR samples may be centered at samples 5 through 14 of a 22 sample CIR estimate, although other selection schemes are contemplated.

In an exemplary embodiment, the decision logic receives a plurality of predetermined thresholds that define first and second operating regions of the PER performance mapping. The decision logic compares the SNR and multipath metrics with the plurality of predetermined thresholds to determine an operating point within the PER performance mapping. The predetermined thresholds may include first and second SNR thresholds and a multipath threshold, in which the first operating region is defined as a union of a first zone below the first SNR threshold and a second zone between the first and second SNR thresholds and below the multipath threshold, and in which the second operating region is defined as a union of a third zone above the second SNR threshold and a fourth zone between the first and second SNR thresholds and above the multipath threshold.

The compensation system may include a channel matched filter (CMF), an equalizer, or both. The CMF has programmable taps to correct for multipath distortion. If the CMF is included, a memory is also included which stores default filter weights, and select logic is included to select between the calculated filter weights of the CIR estimator and the default filter weights stored in the memory for programming the CMF taps. The decision logic controls the select logic to select between the default and calculated filter weights depending on an operating point location within the PER performance mapping. If an equalizer is included, the decision logic enables the equalizer depending on an operating point location within the PER performance mapping. If both are included, the decision logic enables the equalizer when the calculated filter weights are selected and disables the equalizer when the default filter weights are selected.

A method of determining an appropriate compensation for a wireless receiver, the receiver including a compensation system, that communicates in a wireless medium according to an embodiment of the present invention includes determining a packet error rate (PER) performance mapping based on SNR and multipath distortion defining a first operating region of the wireless receiver in which calculated compensation is employed, and a second operating region in which default or no compensation is employed. The method includes measuring a CIR of the wireless channel and calculating corresponding filter weights, determining an SNR metric of the wireless channel based on samples received from the wireless channel, determining a multipath metric of the wireless channel using the calculated CIR, determining an operating point of the wireless receiver based on the multipath and SNR metrics and applying the operating point to the performance mapping, and operating the wireless receiver with or without compensation or with default compensation.

If a CMF is included, the method includes operating the CMF with the default filter weights if the operating point is within the first operating region and operating the CMF with the calculated filter weights if the operating point is within the second operating region. If an equalizer is included, the method includes disabling the equalizer if the operating point is within the first operating region and enabling the equalizer if the operating point is within the second operating region.

The SNR metric may be determined by integrating a first plurality of samples received from the wireless medium while no packets are being transmitted to measure a noise power level in the wireless medium, integrating a second plurality of samples received from the wireless medium while a packet is being transmitted to measure a packet power level in the wireless medium, and combining the packet and noise power levels to determine the SNR metric. In an exemplary embodiment, the first plurality of samples may include 32 bins of 32 noise samples each and the second plurality of samples may include 8 bins of 32 packet samples each. The noise power level may be determined as a moving average prior to receiving a packet.

The determining a multipath metric may include calculating a delay spread of a CIR estimation over a selected number of contiguous CIR samples having a largest energy. An exemplary embodiment is illustrated in which a contiguous 10 samples of a 22 sample CIR are selected, such as samples 5 through 14 in a particular embodiment. The multipath metric may be determined by locating a peak magnitude of the selected CIR samples, locating sidelobes relative to the peak magnitude, summing the sidelobe magnitudes together to determine a sidelobe sum, and dividing the peak magnitude by the determined sidelobe sum. A weighting scheme may be applied to the sidelobe magnitudes, such as an exponential weighting scheme or a linearly increasing weighting scheme. The multipath metric may be a ratio parameter represented by a digital value having a predetermined number of bits sufficient to achieve a desired resolution.

The PER performance mapping may be determined by defining the first operating region as that in which the PER performance of the wireless receiver operated without an equalizer and using a CMF with predetermined default filter weights is at least as good as PER performance when using the CMF with calculated filter weights and using an equalizer. The PER performance mapping may be implemented by defining a plurality of performance thresholds including at least two SNR thresholds and at least one multipath threshold. In an exemplary embodiment, the PER performance mapping includes defining first and second SNR thresholds and a multipath threshold, in which the first operating region is defined as a union of a first zone below the first SNR threshold and a second zone between the first and second SNR thresholds and below the multipath threshold, and in which the second operating region is defined as a union of a third zone above the second SNR threshold and a fourth zone between the first and second SNR thresholds and above the multipath threshold.

In a specific embodiment, the first SNR threshold is 6 decibels, the second SNR threshold is 10 decibels and the multipath threshold is based on a RMS delay spread channel of between 30 to 40 nanoseconds. For an actual radio in the laboratory, the second SNR threshold may be adjusted by determining a first curve by sweeping PER from an SNR of 6 decibels to an SNR of 15 decibels under no multipath conditions and not using the equalizer using the CMF with the predetermined default filter weights, determining a second curve by sweeping PER from an SNR of 6 decibels to an SNR of 15 decibels using the CMF with calculated weight parameters and using the equalizer under no multipath conditions, and defining the second SNR threshold based on a crossover point of the first and second curves. The first SNR threshold can then be based on the second SNR threshold accounting for failures in the multipath estimation process. The first threshold sets the region where the multipath estimate is to be considered invalid and consequently default CMF weights with no equalizer should always be employed. Detailed simulation of the radio can be used to determine a fixed offset from the second threshold to be used to set the first threshold.

The multipath threshold may be adjusted by setting up a target RMS delay spread channel. The desired target RMS delay spread value may be predetermined by detailed simulation of the radio's SNR and multipath performance and inspection of the data for the value that best allocates the operating regions. The adjustment is accomplished by varying the multipath threshold until successive measurements of multipath distortion are above the multipath threshold approximately half the time. In exemplary embodiments, the target RMS delay spread channel is within a range of 30 to 40 nanoseconds.

BRIEF DESCRIPTION OF THE DRAWINGS

A better understanding of the present invention can be obtained when the following detailed description of exemplary embodiments is considered in conjunction with the following drawings, in which.

DETAILED DESCRIPTION OF EMBODIMENT(S) OF THE INVENTION

Figure 1:
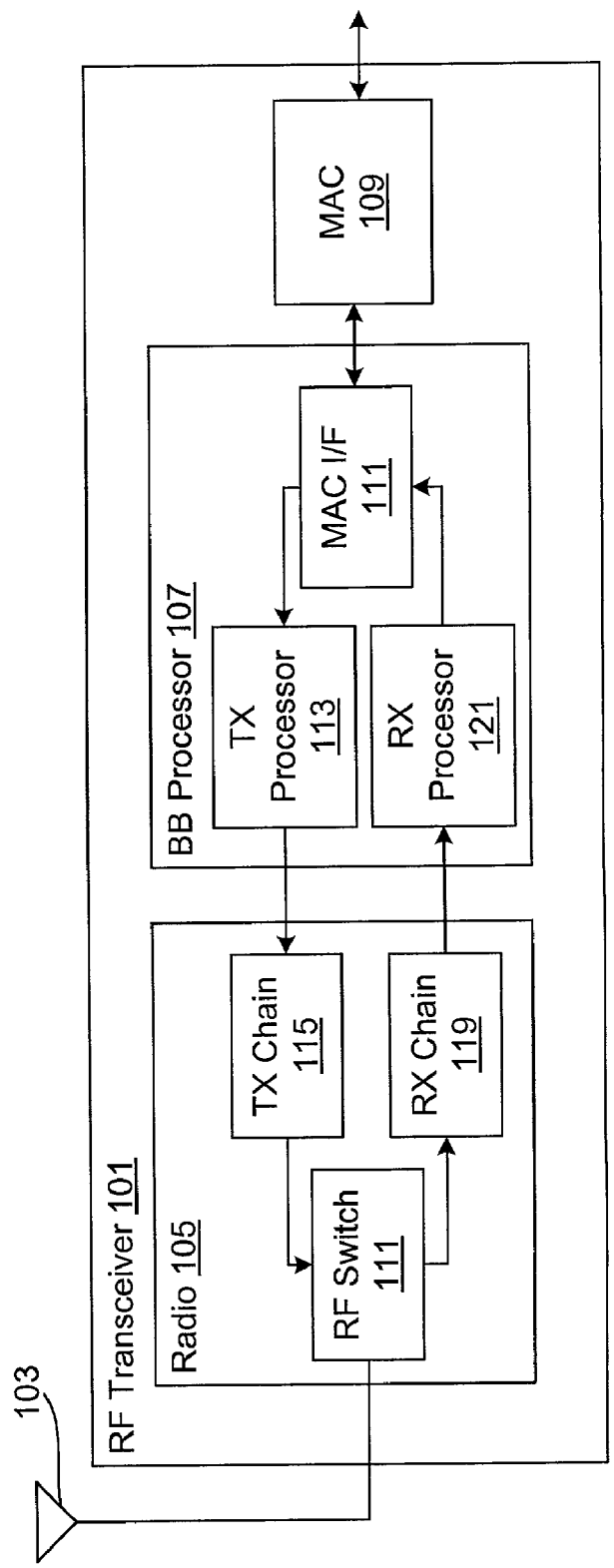
FIG. 1 is a block diagram of an exemplary wireless radio frequency (RF) transceiver implemented according to an embodiment of the present invention.

FIG. 1 is a block diagram of an exemplary wireless radio frequency (RF) transceiver 101 implemented according to an embodiment of the present invention. The RF transceiver 101 may be used to communicate with one or more similar wireless devices across a wireless medium, such as within a wireless local area network (WLAN) or the like. Although the present invention is illustrated for use in a WLAN device in exemplary embodiments, it is understood that the present invention applies to any radio or wireless communication device and is not limited to WLAN applications.

The RF transceiver 101 may be used by any type of device to incorporate wireless communication capabilities, such as a wireless access point (AP), any type of computer or computer system (e.g., personal computers, laptop computers, desktop computers, etc.,), printing devices including any type of printer technology, personal digital assistants (PDAs) or the like, scanners, fax machines, etc. The RF transceiver 101 may be configured as a plug-in peripheral or expansion card that plugs into an appropriate slot or interface of a computer system, such as a Personal Computer Memory Card International Association (PCMCIA) card or PC Card or may be implemented according to any type of expansion or peripheral standard, such as according to the peripheral component interconnect (PCI), the Industry Standard Architecture (ISA), the Extended-ISA (EISA) standard, etc. Mini PCI cards with antennas embedded in displays are also contemplated. Self-contained or standalone packaging with appropriate communication interface(s) is also contemplated, which is particularly advantageous for APs. The RF transceiver 101 may be implemented as a separate unit with serial or parallel connections, such as a Universal Serial Bus (USB) connection or an Ethernet interface (twisted-pair, coaxial cable, etc.), or any other suitable interface to the device. Other types of wireless devices are contemplated, such as any type of wireless telephony device including cellular phones.

Figure 2:
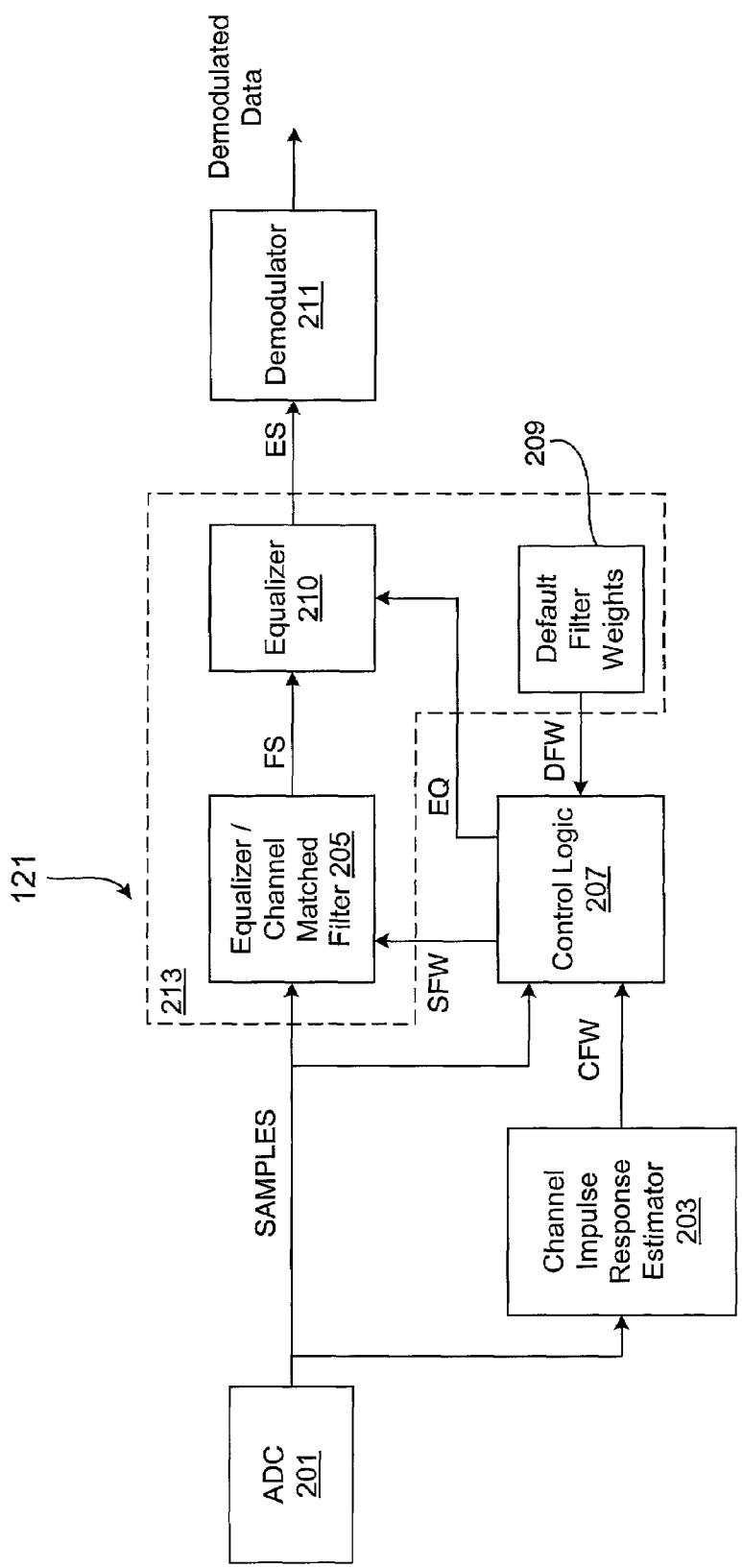
FIG. 2 is a block diagram illustrating a relevant portion of the RX processor of FIG. 1 according to an exemplary embodiment of the present invention.

The RF transceiver 101 communicates via the wireless medium using one or more antennas 103 coupled to an internal radio chip or device 105. The radio 105 is coupled to a Baseband (BB) processor 107 that generally converts between RF signals and Baseband signals. The Baseband processor 107 is further coupled to a medium access control (MAC) device 109 that communicates with the underlying device or system. Digital data sent from or received by the RF transceiver 101 is processed through the MAC 109. For transmission, the MAC 109 asserts digital data signals via a MAC interface (I/F) 111 to a transmission (TX) processor 113, which formulates data into packets for transmission. The digital packet information is converted to analog signals using a digital to analog converter (DAC) (not shown) and processed by a TX chain 115 for converting the packets into RF signals suitable for transmission via the antenna 103. An RF switch 117 selects the TX chain 115 for transmission and an RF chain 119 for reception of packets. The RX chain 119 extracts Baseband signals from a received RF signal and provides the Baseband signals to a receive (RX) processor 121 via an analog to digital converter (ADC) 201 (FIG. 2). The RX processor 121 generally performs the inverse functions of the TX processor 113 to extract data from received packets into data signals for the underlying device. The data is forwarded to the MAC 109 via the MAC I/F 111.

The RF transceiver 101 may be implemented according to the Institute of Electrical and Electronics Engineers, Inc. (IEEE) 802.11b standard operating at approximately 2.4 Gigahertz (GHz) for use within a WLAN. It is appreciated, however, that the teachings of the present invention may be applied in the same or similar manner to other types of wireless communication via a selected RF band.

FIG. 2 is a block diagram illustrating a relevant portion of the RX processor 121 according to an exemplary embodiment of the present invention. The ADC 201 converts analog baseband signals from the RF chain 119 to digital baseband signals referred to as "SAMPLES" according to a predetermined sampling rate. The SAMPLES signal is provided to a Channel Impulse Response (CIR) estimator 203, a Channel Matched Filter (CMF) 205, and control logic 207. The CIR estimator 203 calculates filter weights during a training portion of each new packet received from the wireless medium. The calculated filter weights (CFW) are normally used to program the CMF 205. In general, the CIR estimator 203 estimates the multipath profile of the wireless medium and calculates corresponding filter weights for the CMF 205, which attempts to undo the multipath distortion of the wireless channel by applying inverse filtering to the sampled signal. The CMF 205 asserts a filtered sample (FS) signal at its output, which is provided to the input of an equalizer 210. The equalizer 210 further fine tunes compensation based on estimated or trained decision errors (or otherwise determined signal error information). The equalizer 210 asserts an equalized signal (ES) to a demodulator 211, which demodulates the received data and asserts corresponding demodulated data. The demodulation process is not further described.

It has been determined experimentally that under certain conditions superior performance is achieved "without" compensation or with "default" compensation. For example, default filter weights (DFW) stored in a memory 209 achieve superior performance than the calculated filter weights for programming the taps of the CMF 205 under these conditions. Also, it has been determined that under theses same conditions, superior performance is achieved without the equalizer 210 if included or if the equalizer 210 is the sole compensation. Performance is measured by comparing the packet error rate (PER) metric. It has further been determined that the calculated filter weights (CFW) should always be used when using the equalizer 210 of both the CMF 205 and equalizer 210 are employed, so that the equalizer 210 is not used when the default filter weights are used for the CMF 205. The control logic 207 monitors the SAMPLES signal and the calculated filter weights from the CIR estimator 203 to determine whether to use the default filter weights from the memory 209 and no equalizer 210 or to use the calculated filter weights along with the equalizer 210.

As described further below, the control logic 209 uses the digital SAMPLES to determine a signal to noise ratio (SNR) metric and uses the calculated filter weights to determine a multipath metric. The SNR and multipath metrics define an operating point that is applied to a PER performance mapping with predetermined operating regions based on SNR and multipath distortion. A first operating region dictates using the CMF 205 with default filter weights and not using the equalizer 210 while a second operating region dictates using the equalizer and the CMF with calculated filter weights. The first and second operating regions are mutually exclusive so that an operating point is always in one or the other. The operating regions may be accurately defined or simplified using multiple thresholds, where the thresholds, alone or in combination with other thresholds, define operating zones that are combined to define the operating regions. In the illustrated embodiment, the SNR and multipath metrics are compared to predetermined thresholds to make the appropriate decision to improve performance. If the CMF 205 is included within the compensation system 213, then selected filter weights (SFW) are provided to the CMF 205 to program the taps of the CMF. The SFW are selected from either the CFW or the DFW. If the equalizer 210 is included within the compensation system 213, then an equalizer enable signal EQ is asserted by the control logic 209 to enable or disable the equalizer 210 depending upon the decision made.

The CMF 205, the memory 209 and the equalizer 210 collectively form a compensation system 213. The CMF 250 is implemented as an equalizer, yet is typically less precise than the equalizer 210 since it is based on a channel estimate which is in turn derived from some other signal processing technique such as correlation. The equalizer 210 is more precise, but usually requires slightly higher signal fidelity to set up and often more intensive computations. It is noted that the compensation system 213 may be designed with either or both. If only the CMF 205 is included, then the FS signal is provided directly to the demodulator 211. If only the equalizer 210 is provided, then the SAMPLES are provided directly to the input of the equalizer 210 and the memory 209 is unnecessary.

Figure 3:
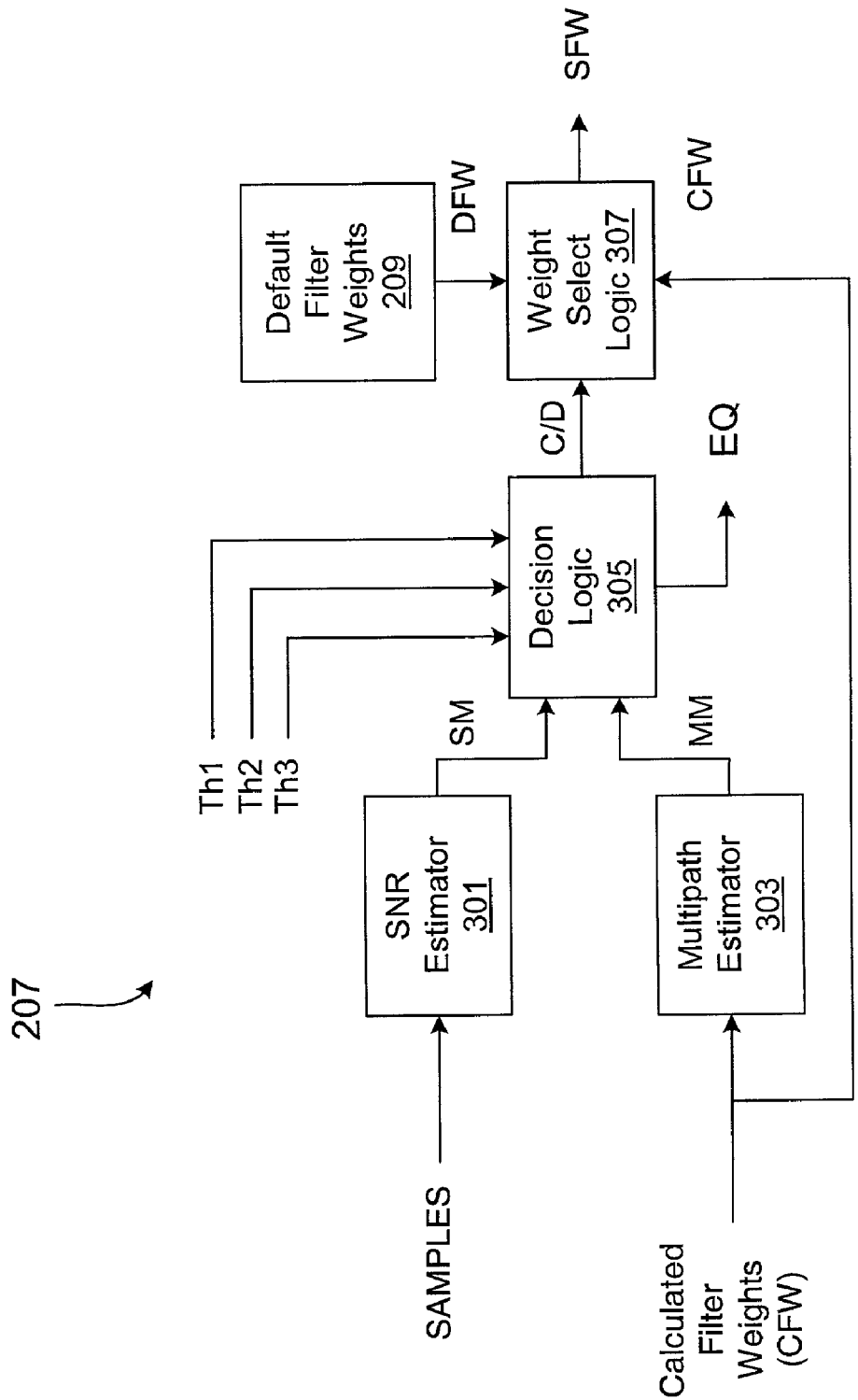
FIG. 3 is a simplified block diagram of an exemplary embodiment of the control logic as interfaced to the memory storing the DFW of FIG. 2.

FIG. 3 is a simplified block diagram of an exemplary embodiment of the control logic 207 as interfaced to the memory 209 storing the DFW. The SAMPLES signal is provided to an SNR estimator 301, which estimates the SNR in the wireless channel and asserts an SNR estimate metric (SM) indicative thereof. The CFW are provided to a multipath estimator 303, which estimates the level of multipath distortion in the wireless channel and asserts a multipath metric (MM) indicative thereof. The SM and MM signals are provided to decision logic 305, along with three predetermined thresholds Th1, Th2 and Th3. The thresholds Th1–Th3 are used in a simplified logic embodiment in which the SNR metric is compared with the first two SNR thresholds Th1 and Th 2 and the multipath metric is compared to the third threshold Th3 to facilitate the decision making process, as further described below.

The decision logic 305 asserts a decision signal C/D to weight select logic 307, where the C/D signal is indicative of which filter weights to use for the CMF. In one embodiment, the C/D signal is a binary signal that is asserted to one logic level ("C") for calculated weights and to an opposite binary level for default weights ("D"). The weight select logic 307 receives the CFW from the CIR estimator 203, the default filter weights from the memory 209 and the C/D signal from the control logic 305, and asserts the selected filter weights to program the taps of the CMF 205. The decision logic 305 also asserts the EQ signal to enable or disable the equalizer 210, where the EQ signal may also be a binary signal (e.g., high or logic one to enable and low or logic zero to disable or vice versa). The equalizer 210 is enabled if calculated filter weights are selected (C) and disabled (or otherwise bypassed) if the default filter weights are selected (D).

Figure 4:
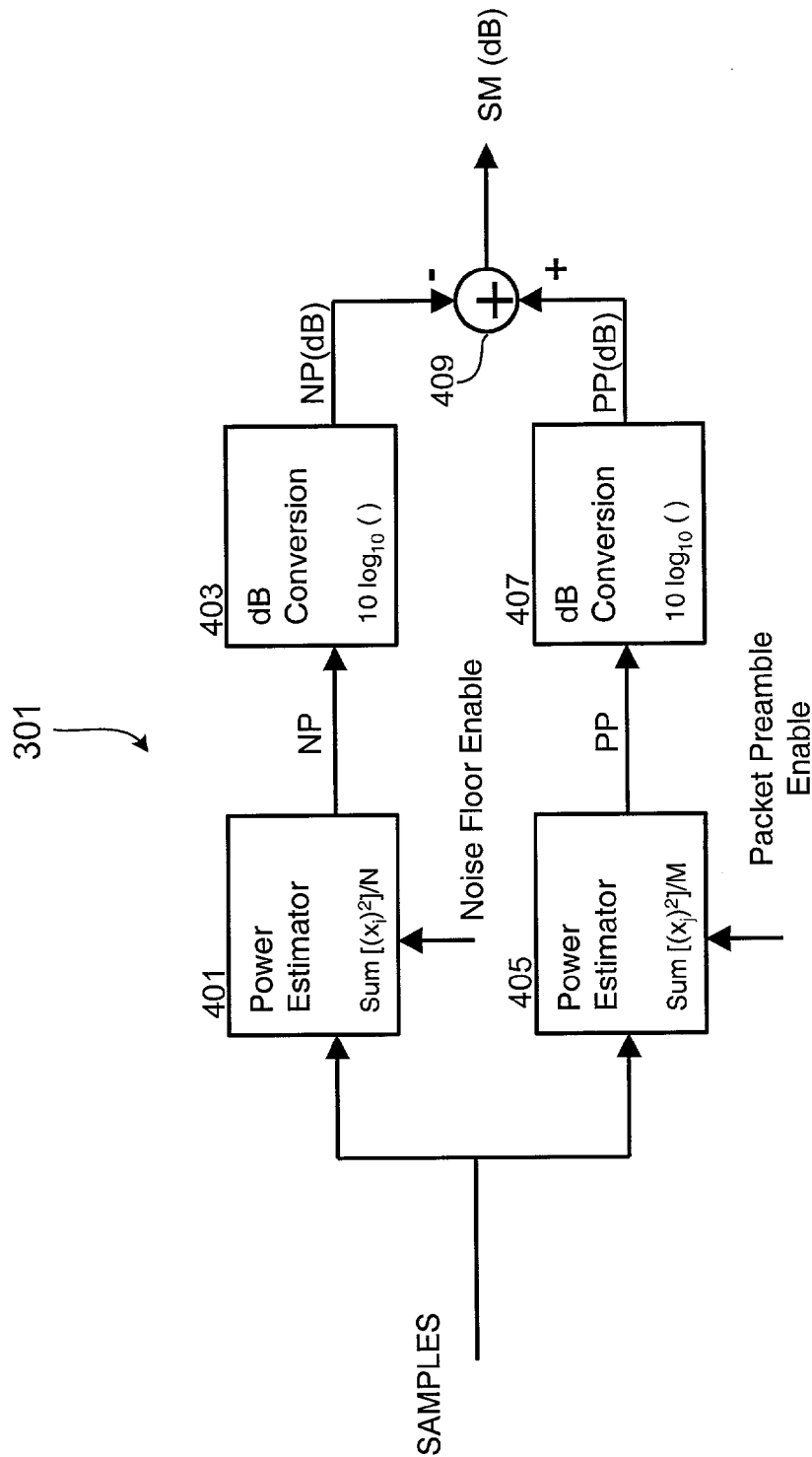
FIG. 4 is a block diagram of an exemplary embodiment of the SNR estimator of FIG. 3.

FIG. 4 is a block diagram of an exemplary embodiment of the SNR estimator 301. The SAMPLES signal is provided to two separate power estimators, including a noise power estimator 401 and a packet power estimator 405. The noise power estimator 401 is activated by a Noise Floor Enable signal and the packet power estimator 405 is activated by a Packet Preamble Enable signal. While the noise power estimator 401 is enabled, it retrieves N samples $x_i$ (where "i" is an index value that ranges from 1 to N), squares each sample, sums the N samples together and divides by the total number of samples N. The result is a noise power value NP, which is provided to a decibel (dB) converter 403. The dB converter 403 converts the NP value to decibels ($10 \log_{10}$ [NP]) and asserts an NP(dB) value to the inverting input of a summing junction 409. In a similar manner, while the packet power estimator 405 is enabled, it retrieves M samples $x_j$ (where "j" is an index value that ranges from 1 to M), squares each sample, sums the M samples together and divides by the total number of samples M. The result is a packet power value PP, which is provided to a decibel (dB) converter 407. The dB converter 407 converts the PP value to decibels ($10 \log_{10}$ [SP]) and asserts an PP(dB) value to the non-inverting input of the summing junction 409. The summing junction subtracts NP(dB) from PP(dB) and asserts the resulting SNR metric (SM) at its output in dB.

Figure 5:
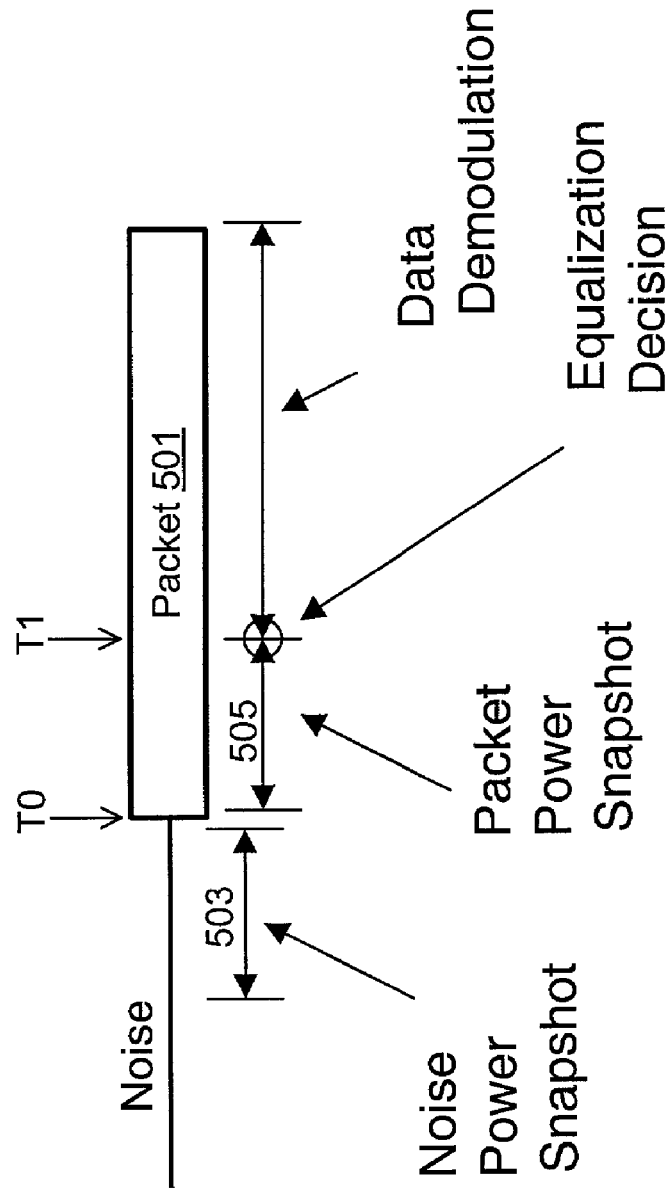
FIG. 5 is a simplified timing diagram illustrating the relative time periods used by the power estimators of FIG. 4 to further illustrate the noise and packet measurement process to determine the SNR metric.

FIG. 5 is a simplified timing diagram illustrating the relative time periods used by the power estimators 401, 405 to further illustrate the noise and packet measurement process to determine the SNR metric. A packet 501 is detected asserted on the wireless channel beginning approximately at a time T0. Prior to the time T0, the Noise Floor Enable signal is asserted (and the Packet Preamble Enable signal is negated) so that the noise power level of the wireless channel is tracked by the noise power estimator 401. After time T0, the Packet Preamble Enable signal is asserted (and the Noise Floor Enable signal is negated) so that the signal power level of an incoming packet is traced by the packet power estimator 405. As shown, a noise power snapshot is made during a time period 503 prior to time T0. When a packet is detected, a packet power snapshot is made during a time period 505 between the time T0 and a time T1 when the equalization decision must be made. After the equalization decision is made as to which filter weights to use and whether the equalizer is enabled, the CMF 205 is programmed (if necessary) and the remaining portion of the packet is processed via the CMF 205, the equalizer 210 (if provided) and the demodulator 211.

The values of N and M define the integration time or number of samples integrated for the noise and signal power values, respectively. The greater the number of samples, the more accurate the corresponding value. In one embodiment, the total number of noise samples N varies between packets. In this case, the number continues to increase (to a predetermined maximum) until a packet is detected so that the noise power estimate is continuously adjusted. The process may be continued from previous values or started anew after each packet. Alternatively, as represented by the time period 503, N is a predetermined number and the noise power level is a moving average in which the oldest samples are discarded in favor of newer samples and the process is repeated until a packet is detected. In this latter case, the noise power estimate more accurately reflects the noise power level just prior to onset of each packet. In a more specific embodiment, N represents 32 bins of 32 samples for a total number of noise samples of N=1,024. In this case, the noise power is a moving average in which the noise power estimate is updated for each new 32 sample bin by throwing out the oldest bin and recalculating using the newest bin until a packet is detected. The value M is limited since the time period 505 is a relatively fixed period. A choice that has been determined to be acceptable is 8 bins of 32 samples for a total number of packet samples of M=256.

The "ideal" multipath metric would be to directly calculate the true root-mean-square (RMS) delay spread of the CIR estimation according to the following equations 1, 2 and 3:

$$\tau_{rms} = \overline{\tau^2} - (\overline{\tau})^2 \qquad (1)$$

where $$\overline{\tau^2} = (\tau_1^2|\beta_1|^2 + \tau_2^2|\beta_2|^2 + \ldots )/(|\beta_1|^2 + |\beta_2|^2 + \ldots ) \qquad (2)$$

$$\overline{\tau} = (\tau_1|\beta_1|^2 + \tau_2|\beta_2|^2 + \ldots )/(|\beta_1|^2 + |\beta_2|^2 + \ldots ) \qquad (3)$$

and $\tau_i$ is the sample time step and $\beta_i$ is the CIR tap. It has been determined, however, that this metric is not as accurate as desired around and below a SNR of 10 dB, which is where accuracy is most desired. An experimental investigation has revealed that greater performance results from calculating the delay spread over only a predetermined number of contiguous samples having the most energy. A comparison has been made for a CIR of 10, 16 and 22 samples of a 22 sample CIR. The 10 sample estimate was judged to be acceptable. Direct calculation of this quantity is involved and prohibitive from an implementation cost standpoint so that simplification is considered desirable.

The first simplification is to reduce the calculations involved in determining which 10 of the 22 total possible CIR taps should be considered. A search was performed and it was found that little degradation resulted using fixed samples numbered 5:14 (5, 6, 7, . . . , 13, 14, or 5–14). This is intuitively palatable since some degree of peak centering results from the CIR processing. Little degradation was observed using either consecutive samples 4:13 or 6:15, illustrating robustness of the 5:14 choice. The second simplification is to reduce the delay spread calculation itself. Many of the operations in the delay spread calculation are involved in removing the bias of the mean. The bias removal operation is simplified by locating the peak magnitude and weighting the calculation sums relative to the determined peak location. One determined scheme is to compare the peak energy to a simple sum of sidelobe energy. Here, each sidelobe sample is weighted equally. This multipath metric exhibits substantially higher variance than the full RMS delay spread estimate. To improve the variance, a weighting process of the sidelobe sum is used. In one embodiment, an exponential weighting of the sidelobe sum similar to the true RMS delay spread calculation is used. Variance is better, but a narrow threshold region exists. In another embodiment, a linearly increasing weight scheme produced the desired characteristics. The linear scheme multipath metric resulted in improved variance and threshold discrimination.

Figure 6:
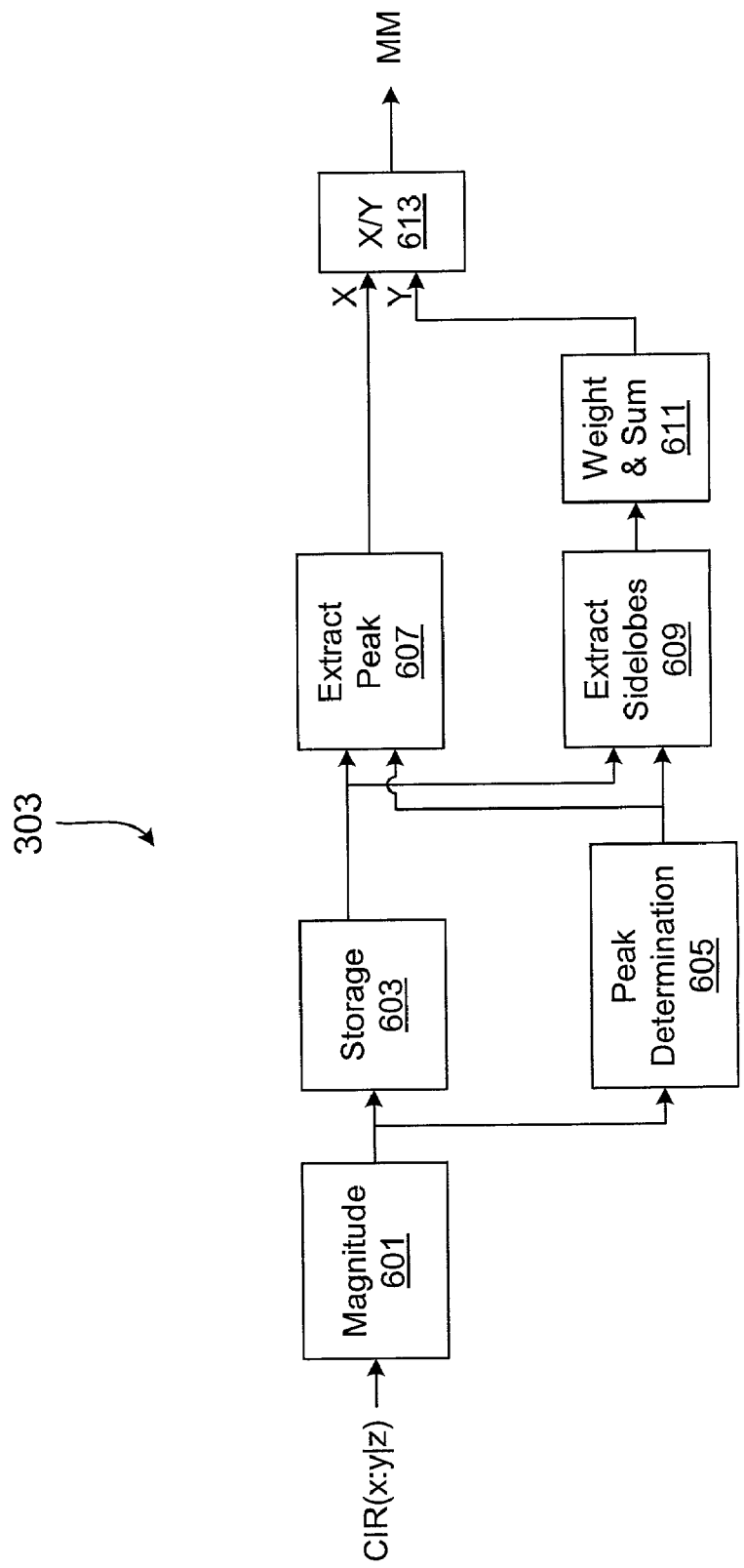
FIG. 6 is a block diagram of an exemplary embodiment of the multipath estimator of FIG. 3 employing a determined multipath metric solution.

FIG. 6 is a block diagram of an exemplary embodiment of the multipath estimator 303 employing the multipath metric solution described above. The magnitudes of samples x:y of a "z" sample CIR estimate, shown as CIR(x:y|z), are retrieved by a magnitude block 601. As described above, a suitable selection includes samples 5:14 of a 22 sample CIR (x=5, y=14, and z=22). The magnitudes are provided to a storage block 603 for storage and to a peak determination block 605 to identify the peak magnitude and its location in the storage block 603. The identity and location output of the peak determination block 605 is provided to a peak extraction block 607, which extracts the peak magnitude from the storage block 603 and provides the extracted peak magnitude as the X input of an X/Y divide block 613. The outputs of the storage and peak determination blocks 603, 605 are also provided to a sidelobe extraction block 609, which extracts the sidelobe magnitudes from the storage block 603. The extracted sidelobe magnitudes are provided to a weight and summation block 611, which determines a sidelobesum value according to the following equation 4:

$$sidelobesum = \sum_{i=1}^{PeakLocation-1} i * |\beta_{PeakLocation-i}| + \sum_{i=1}^{10-PeakLocation} i * |\beta_{PeakLocation+i}| \qquad (4)$$

The summation block 611 performs the linearly increasing weight scheme as described previously and sums the values together to obtain the sidelobesum. The sidelobesum value is provided as the Y input of the X/Y divide block 613. The X/Y divide block 613 performs divides X by Y to find the value (peak magnitude/sidelobesum), which is provided as the multipath metric MM.

PER varies with the level of quantization at the input to the multipath metric calculation. Floating point precision produces the lowest performance degradation at the expense of increased circuit complexity. An evaluation of the change in PER versus the number of bits used has demonstrated that nine (9) bits produces negligible degradation with little extra implementation cost, although less bits (e.g., 6 bits) is considered adequate. In a specific embodiment, examination of the multipath metric performance at 6 dB suggests a threshold resolution of 0.025 covering the range from 0 to 0.5, which is easily covered by six fractional bits (0.015626 LSB weight).

Figure 7:
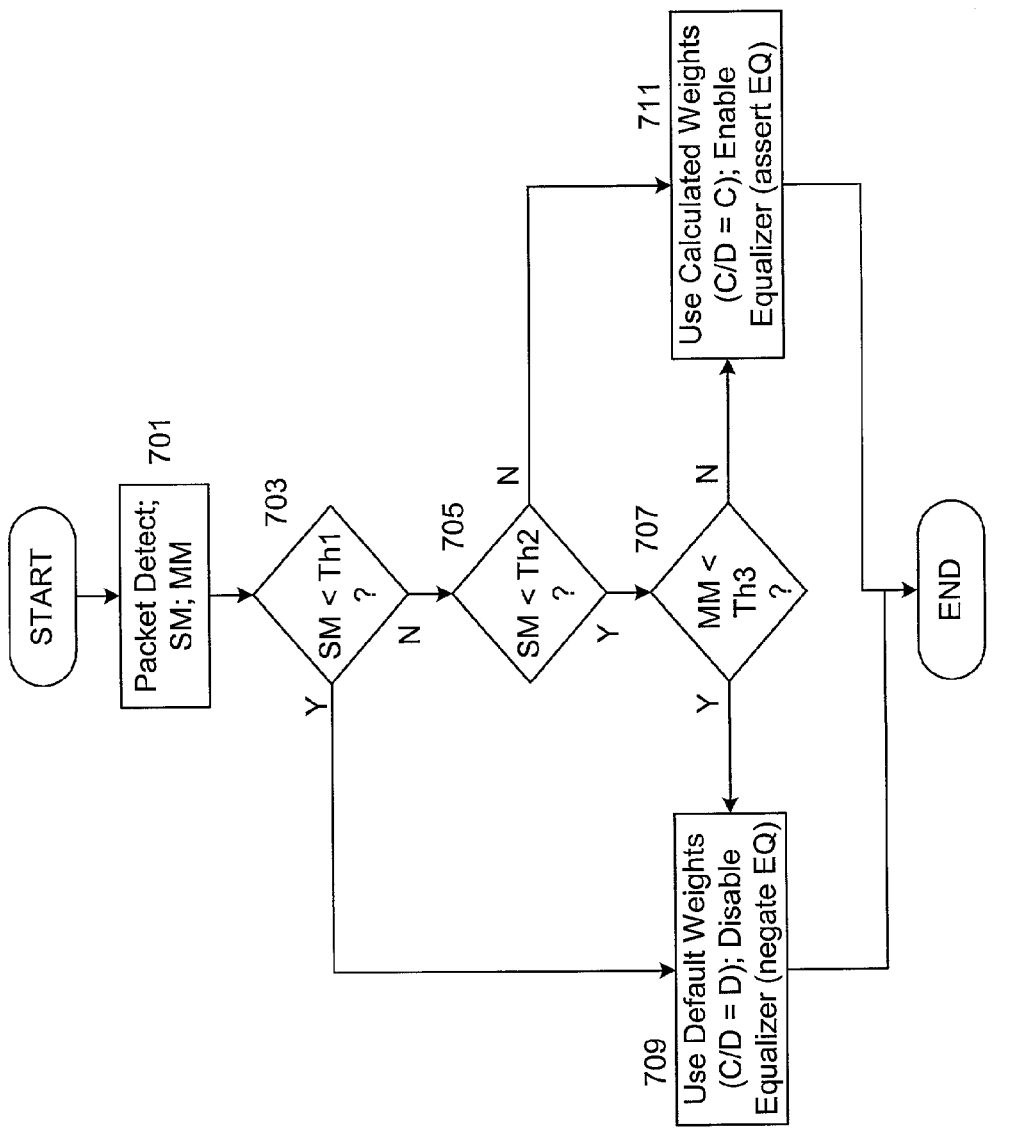
FIG. 7 is a block diagram illustrating operation of an exemplary configuration of the decision logic of FIG. 3 employing simplified logic in which the operating regions of the PER performance mapping are defined using predetermined thresholds.

FIG. 7 is a block diagram illustrating operation of an exemplary configuration of the decision logic 305 employing simplified logic in which the operating regions of the PER performance mapping are defined using the thresholds Th1–Th3. As previously described, the decision logic 305 receives the SM and MM metrics and the three thresholds Th1, Th2 and Th3. Operation begins at a first block 701 when a packet is detected. The SM and MM metrics are determined as of time T1 (FIG. 5) when the decision needs to be made to properly process the packet. At next decision block 703, it is determined whether SM is less than the first SNR threshold Th1. If so, operation proceeds to block 709 at which the default filter weights are used for the CMF 205 (if provided) and the equalizer 210 is not used (e.g., disabled or bypassed) (if provided) and operation is completed. In this case, the SNR is low enough so that the default weights are used regardless of the multipath metric. If, however, SM is not less than Th1, then operation proceeds instead from block 703 to next decision block 705, at which it is determined whether SM is less than the second SNR threshold Th2. If not, then operation proceeds to block 711 at which the calculated filter weights are used for the CMF 205 and the equalizer 210 is used (e.g., enabled or selected) and operation is completed. In this case, the SNR is considered high enough so that the calculated weights and the equalizer 210 are used regardless of the multipath metric. If, however, SM is not less than Th2 (and greater than Th1), then operation proceeds to next decision block 707 at which is it determined whether MM is less than the multipath threshold Th3. If so, operation proceeds to block 709 and if not, operation proceeds to block 711. In this case, the SNR is between the Th1 and Th2 thresholds so that MM determines whether use the default weights and no equalizer or the calculated weights with the equalizer.

Figure 8B:
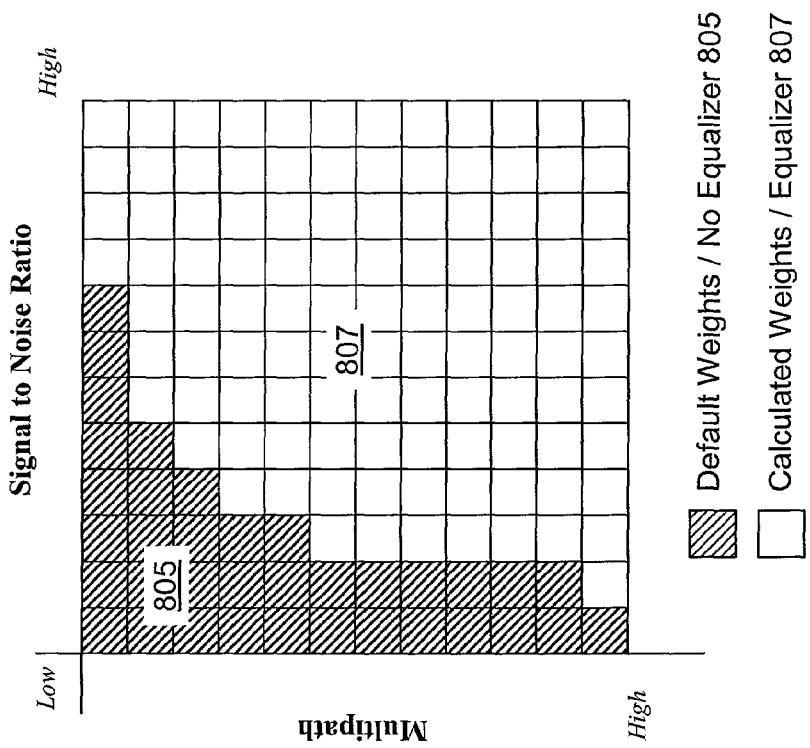
FIG. 8B is a PER performance mapping graph diagram plotting SNR versus multipath similar to FIG. 8A except illustrating the selected operating regions when full mapping logic is applied.
Figure 8A:
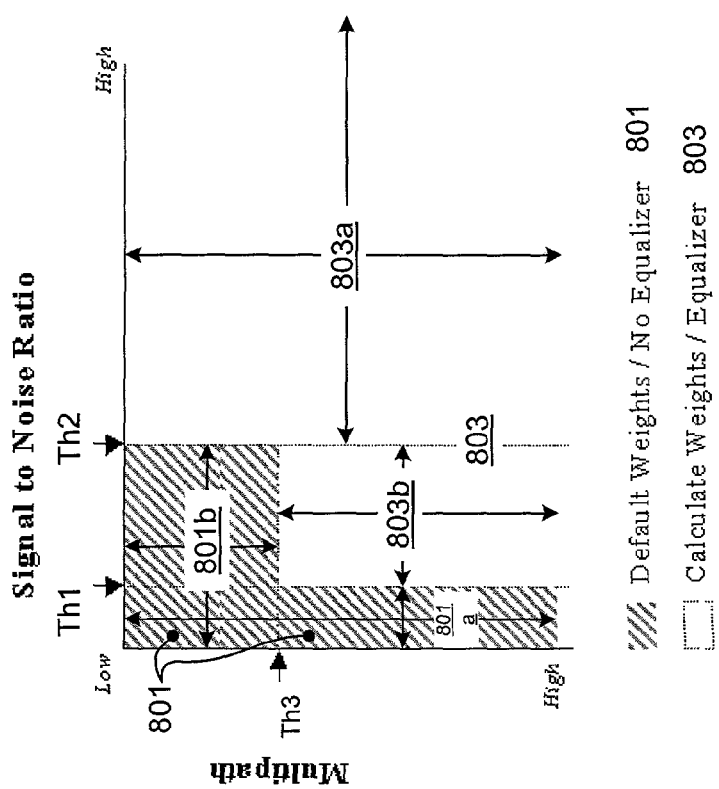
FIG. 8A is a packet error rate (PER) performance mapping graph diagram plotting SNR versus multipath illustrating the two operating regions for the simplified logic case employed by the exemplary decision logic of FIG. 3.

FIG. 8A is a packet error rate (PER) performance mapping graph diagram plotting SNR versus multipath illustrating the two operating regions for the simplified logic case employed by the exemplary decision logic 305. SNR is plotted on the horizontal axis and multipath is plotted on the vertical axis, each between low and high values. The low to high scale represents the expected range in most anticipated environments. A first shaded region 801 is defined as the union of a first zone 801a and a second zone 801b. A second shaded region 803 is defined as the union of a third zone 803a and a fourth zone 803b. The shaded regions 801 and 803 are mutually exclusive and define the total operating region based on SNR and multipath. The first zone 801a is defined by the first Th1 in which SNR is below Th1. The second zone 801b is defined by thresholds Th2 and Th3 in which SNR is below Th2 and multipath is below Th3. The operating region 801 is defined as the union of zones 801a and 801b in which the default weights are used for the CMF 205 and the equalizer 210 is not used. The third zone 803a is defined by the threshold Th2 in which SNR is greater than Th2. The fourth zone 803b is defined by all three thresholds Th1–Th3 in which SNR is between thresholds Th1 and Th2 and greater than Th3. The operating region 803 is defined as the union of zones 803a and 803b in which the calculated weights are used for the CMF 205 and the equalizer 210 is used or otherwise enabled.

It is appreciated that the use of the thresholds Th1–Th3 greatly simplifies determination of the operating point within the PER mapping to simplify the corresponding decision making logic. The thresholds Th1–Th3 may be determined experimentally or by calibration techniques and stored as digital values in programmable registers of the baseband processor 107. The SNR and multipath metrics are also generated as digital values to define an operating point. The measured metric parameters are compared to one or more corresponding thresholds using relatively simple compare logic as illustrated by the flowchart of FIG. 7 to determine whether the operating point is within region 801 or within region 803. Although the simplified approach may cause some erroneous decisions, the simplification may be worth the slight performance degradation in certain configurations.

FIG. 8B is a PER performance mapping graph diagram plotting SNR versus multipath similar to FIG. 8A except illustrating the selected operating regions when full mapping logic is applied. The shaded region 805 defines a first operating region in which the default weights are used for the CMF 205 and the equalizer 210 is not used whereas in the remaining non-shaded region 807 defines a second operation region in which the calculated weights are used for the CMF 205 along with the equalizer 210 is not used or bypassed. An implementation employing the full mapping logic FIG. 8B achieves greater performance at the cost of a more complicated calculation and decision logic design. For example, multiple SNR thresholds and multiple multipath thresholds may be used to define multiple zones of operation that clearly delineate the operating regions 805 and 807 for more accurate decisions. The tradeoffs are considered a matter of design choice.

The thresholds Th1–Th3 are determined experimentally or during a calibration procedure for each radio or for a representative sampling of radios of a given radio type. In one configuration, a radio is placed in a calibration or test environment with no multipath distortion and PER is swept from an SNR of about 6 dB to an SNR of about 15 for both forced default weights/no equalizer and forced calculated weights/equalizer enabled. Th2 is selected at or just below the PER crossover point of the two resulting curves. Th1 is selected at a point below Th2 at which the multipath estimate begins to fail. It has been determined by simulation that an ad hoc differential of 4 dB below Th2 for Th1 provides good results. Additional testing and tweaking on a case-by-case basis may yield better overall results for particular radios. Experimental results have demonstrated that a multipath metric corresponding to an RMS delay spread channel of between 30 and 40 nanoseconds (ns) or more particularly 35 ns is desired. In one embodiment, the multipath threshold, Th3, is adjusted by setting up a 35 ns RMS delay spread channel and adjusting until the high/low indication produces balanced high and low decisions. Due to variation in estimates, for a given true multipath channel equal to the target threshold (35 ns), approximately 50% of the time the estimate will be equal to or slightly greater than the threshold and 50% of the time it will be lower. In other words, due to the spread in successive measurements and assuming that the threshold is centered, the threshold will be tripped half the time. The following table 1 provides acceptable threshold values for the simplified logic design case:

TABLE 1

Selected threshold values Th1–Th3

| Threshold | Value |
|---|---|
| Th1 | 6 dB |
| Th2 | 10 dB |
| Th3 | 0.175 (channel TRMS of 40 ns) |

In table 1, Th3 is a digital ratio value using six fractional bits as previously described resulting in a corresponding True RMS (TMS) delay spread channel of 40 ns. The use of digital values introduces a certain level of acceptable quantization error as known to those skilled in the art.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

I claim:

1. A wireless receiver, comprising:
   a radio that converts radio frequency (RF) signals received from a wireless channel to baseband signals; and
   a baseband processor, coupled to the radio, comprising:

an analog to digital converter (ADC), coupled to the radio, that samples the baseband signals at a predetermined sample rate and that provides corresponding digital samples;

a compensation system, coupled to the ADC, that selectively provides compensation to the digital samples;

a channel impulse response (CIR) estimator, coupled to the ADC, that calculates filter weights based on the digital samples;

a signal to noise (SNR) estimator, coupled to the ADC, that receives the digital samples and that provides an SNR metric;

a multipath estimator, coupled to the CIR estimator, that receives the calculated filter weights and that provides a multipath metric; and decision logic, coupled to the SNR and multipath estimators and the compensation system, that determines an operating point of the receiver based on the SNR and multipath metrics and that controls the compensation system according to the predetermined packet error rate (PER) performance mapping.

2. The wireless receiver of claim 1, wherein the SNR estimator comprises:

a first power estimator that integrates a first plurality of the samples while no packets are being transmitted in the wireless channel to measure a noise power level;

a second power estimator that integrates a second plurality of the samples while a packet is being transmitted in the wireless channel to measure a packet power level; and a combiner that provides the SNR metric based on the measured noise and packet power levels.

3. The wireless receiver of claim 2, wherein the first plurality of the samples comprises 32 bins of 32 noise samples each to develop a moving average and wherein the second plurality of samples comprises 8 bins of 32 packet samples each.

4. The wireless receiver of claim 1, wherein the multipath estimator comprises:

a magnitude block that retrieves the magnitudes of selected CIR estimator samples;

a storage device, coupled to the magnitude block, that stores the retrieved magnitudes;

a peak determination block, coupled to the magnitude block, that identifies a peak magnitude of the selected CIR estimator samples;

a peak extraction block, coupled to the peak determination block and to the magnitude block, that extracts the peak magnitude;

a sidelobe extraction block, coupled to the peak determination block and to the magnitude block, that extracts sidelobes of the selected CIR estimator samples;

a weight and summation block, coupled to the sidelobe extraction block, that weights the sidelobe magnitudes according to a selected weighting scheme and that sums the weighted sidelobes together to provides a sidelobe sum value; and a divider, coupled to the weight and summation block and the peak extraction block, that divides the peak magnitude by the sidelobe sum value to determine the multipath metric.

5. The wireless receiver of claim 4, wherein the weighting scheme comprises linearly increasing weighting of the sidelobe magnitudes.

6. The wireless receiver of claim 4, wherein the magnitude block selects 10 contiguous samples of a 22 sample CIR estimate having a highest energy level.

7. The wireless receiver of claim 6, wherein the magnitude block selects contiguous samples 5 through 14 of the CIR estimate.

8. The wireless receiver of claim 1, wherein the decision logic receives a plurality of predetermined thresholds that define first and second operating regions of the PER performance mapping, wherein the decision logic compares the SNR and multipath metrics with the plurality of predetermined thresholds to determine the operating point within the PER performance mapping.

9. The wireless receiver of claim 8, wherein the plurality of predetermined thresholds includes first and second SNR thresholds and a multipath threshold, in which the first operating region is defined as a union of a first zone below the first SNR threshold and a second zone between the first and second SNR thresholds and below the multipath threshold, and in which the second operating region is defined as a union of a third zone above the second SNR threshold and a fourth zone between the first and second SNR thresholds and above the multipath threshold.

10. The wireless receiver of claim 1, wherein the compensation system, comprising:

a channel matched filter (CMF), coupled to the ADC, that has programmable taps to correct for multipath distortion; and a memory that stores default filter weights; and the wireless receiver further comprising:

select logic, coupled to the CIR estimator, the memory, the decision logic and the CMF and having a select input, that selects between the calculated filter weights of the CIR estimator and the default filter weights stored in the memory for programming the CNF taps based on a selection value provided to the select input;

wherein the decision logic provides the selection value to the select input of the select logic to select between the default and calculated filter weights depending on an operating point location within the PER performance mapping.

11. The wireless receiver of claim 10, wherein the compensation system further comprises an equalizer, coupled to the CMF and the decision logic, and wherein the decision logic enables the equalizer when the calculated filter weights are selected and disables the equalizer when the default filter weights are selected.

12. The wireless receiver of claim 1, wherein the compensation system comprises an equalizer, coupled to the CMF and the decision logic, and wherein the decision logic selectively enables the equalizer depending on an operating point location within the PER performance mapping.

13. A method of determining an appropriate compensation for a wireless receiver that communicates over a wireless channel, the receiver including a compensation system, the method comprising:

determining a packet error rate (PER) performance mapping defining in a first operating region of the wireless receiver in which a calculated compensation is employed, and a second operating region in which default or no compensation is employed;

measuring a channel impulse response (CIR) of the wireless channel and calculating corresponding filter weights for a channel matched filter (CMF);

determining an SNR metric of the wireless channel based on samples received from the wireless channel;

determining a multipath metric of the wireless channel using the calculated filter weights;

determining an operating point of the wireless receiver based on the multipath and SNR metrics and applying the operating point to the PER performance mapping; and if the operating point is within the second operating region, operating the wireless receiver with calculated compensation, and otherwise operating the wireless receiver without compensation or with default compensation using default filter weights.

14. The method of claim 13, further comprising:

if the operating point is within the first operating region, operating the CMF with the default filter weights; and if the operating joint is within the second operating region, operating the CMF with the calculated filter weights.

15. The method of claim 14, the compensation system further including an equalizer, further comprising:

if the operating point is within the first operating region, disabling the equalizer and if the operating point is within the second operating region, enabling the equalizer.

16. The method of claim 13, wherein said determining the SNR metric comprises:

integrating a first plurality of samples received from the wireless channel while no packets are being transmitted to measure a noise power level in the wireless channel;

integrating a second plurality of samples received from the wireless channel while a packet is being transmitted to measure a packet power level in the wireless channel; and combining the packet and noise power levels to determine the SNR metric.

17. The method of claim 16, wherein:

said integrating the first plurality of samples comprises integrating 32 bins of 32 noise samples each to measure the noise power level; and said integrating the second plurality of samples comprises integrating 8 bins of 32 packet samples to measure the noise power level comprises determining a moving average prior to receiving a packet.

18. The method of claim 16, wherein said integrating the first plurality of samples to measure the noise power level comprises determining a moving average prior to receiving a packet.

19. The method of claim 13, wherein said determining the multipath metric comprises calculating a delay spread of a CIR estimation over a selected number of contiguous CIR samples having a largest energy.

20. The method of claim 19, wherein said calculating the delay spread of the CIR estimation over the selected number of contiguous CIR samples having the largest energy comprises selecting 10 samples of a 22 sample CIR.

21. The method of claim 20, wherein said selecting 10 samples of the 22 sample CIR comprises selecting contiguous CIR samples 5 through 14.

22. The method of claim 20, further comprising:
locating a peak magnitude of the selected CIR samples;
locating sidelobes relative to the peak magnitude;
summing sidelobe magnitudes together to determine a sidelobe sum; and
dividing the peak magnitude by the determined sidelobe sum to determine the multipath metric.

23. The method of claim 22, further comprising applying an exponential weighting to the sidelobe magnitudes.

24. The method of claim 22, further comprising applying linearly increasing weighting to the sidelobe magnitudes.

25. The method of claim 19, the receiver including an equalizer, wherein the multipath metric is a ratio parameter represented by a digital value having a predetermined number of bits.

26. The method of claim 25, wherein said determining the PER performance mapping comprises defining the first operating region as that in which the PER performance of the wireless receiver operated without the equalizer and using the CMF with predetermined default filter weights is at least as good as PER performance when using the CMF with calculated filter weights and using the equalizer.

27. The method of claim 13, wherein said determining the PER performance mapping comprises defining a plurality of performance thresholds including at least two SNR thresholds and at least one multipath threshold.

28. The method of claim 27, wherein said determining the PER performance mapping further comprises:

defining first and second SNR thresholds and a multipath threshold in which the first operating region is defined as a union of a first zone below the first SNR threshold and a second zone between the first and second SNR thresholds and below the multipath threshold, and in which the second operating region is defined as a union of a third zone above the second SNR threshold and a fourth zone between the first and second SNR thresholds and above the multipath threshold.

29. The method of claim 28, wherein the first SNR threshold is 6 decibels, the second SNR threshold is 10 decibels and the multipath threshold is based on a root-mean-square (RMS) delay spread channel of between 30 to 40 nanoseconds.

30. The method of claim 28, wherein said defining first and second SNR thresholds further comprises:

under no multipath conditions, determining a first curve by sweeping PER from an SNR of 6 decibels to an SNR of 15 decibels using a channel matched the CMF with the predetermined default filter weights and not using an equalizer;

under no multipath conditions, determining a second curve by sweeping PER from the SNR of 6 decibels to the SNR of 15 decibels using the CMF with calculated filter weights and using the equalizer;

defining the second SNR threshold based on a crossover point of the first and second curves; and defining the first SNR threshold based the second SNR threshold.

31. The method of claim 28, further comprising:

setting up a target root-mean-square (RMS) delay spread channel for the multipath threshold; and adjusting the multipath threshold until successive measurements of multipath distortion are above the multipath threshold approximately half the time.

32. The method of claim 31, wherein the target RMS delay spread channel is within a range of 30 to 40 nanoseconds.

* * * * *

UNITED STATES PATENT AND TRADEMARK OFFICE
CERTIFICATE OF CORRECTION

PATENT NO.        : 7,058,144 B2                                              Page 1 of 1
APPLICATION NO.   : 10/121762
DATED             : June 6, 2006
INVENTOR(S)       : Keith R. Baldwin It is certified that error appears in the above-identified patent and that said Letters Patent is hereby corrected as shown below:

IN THE CLAIMS

Claim 30, Col. 16, Line 40:

Delete the words "a channel matched"

Signed and Sealed this

Twenty-eighth Day of September, 2010

David J. Kappos
*Director of the United States Patent and Trademark Office*